United States Patent

[11] 3,607,294

[72] Inventor Carl Anthon Ernstrom
 Logan, Utah
[21] Appl. No. 724,236
[22] Filed Apr. 25, 1968
[45] Patented Sept. 21, 1971
[73] Assignee Nelson-Ricks Creamery Company
 Salt Lake City, Utah

[54] CHEESE COMPOSITION USEFUL AS A FISH BAIT
 6 Claims, No Drawings

[52] U.S. Cl. .................................................. 99/3,
 99/115, 99/117, 99/178
[51] Int. Cl. ....................................................... A01k 85/00
[50] Field of Search ............................................ 99/1, 2, 3,
 19, 20, 9, 115, 162, 178, 243, 117; 260/403;
 43/41, 42; 252/186

[56] References Cited
 UNITED STATES PATENTS

| | | | |
|---|---|---|---|
| 1,795,238 | 3/1931 | Spence | 99/3 |
| 2,007,218 | 7/1935 | Seltzer | 99/115 |
| 2,081,273 | 5/1937 | Hoermann et al. | 99/162 |
| 2,319,187 | 5/1943 | Ingle | 99/115 X |
| 2,358,320 | 9/1944 | Eisaman | 99/2 |
| 2,555,088 | 5/1951 | Irwin | 43/41 |
| 3,260,674 | 7/1966 | Ross | 252/186 |
| 3,428,459 | 2/1969 | Hinds | 99/3 |
| 2,081,273 | 5/1937 | Hoermann et al. | 99/117 |

FOREIGN PATENTS

| | | | |
|---|---|---|---|
| 1,041,035 | 9/1966 | Great Britain | 99/115 |

*Primary Examiner*—Norman Yudkoff
*Assistant Examiner*—F. E. Drummond
*Attorneys*—Mallinckrodt & Mallinckrodt, P. H. Mallinckrodt, Philip A. Mallinckrodt and David V. Trask

ABSTRACT: A cheese composition suitable for use as a fish bait is produced by techniques similar to those employed for the production of processed or blended cheese spreads. The cheese composition includes ingredients suitable for use in processed or blended cheese spreads but differs from such spreads by the inclusion of a high percentage of nonfat milk solids. The formulation is adjusted to maximize water content and minimize fat content thereby producing a fish bait composition of stiff consistency which can be molded over a fishhook and which will remain in place when it is moved through the water.

CHEESE COMPOSITION USEFUL AS A FISH BAIT

BACKGROUND OF THE INVENTION

1. Field

This invention relates to fish baits and provides a cheese composition suitable for such use.

2. State of the Art

Cheese has been used as bait for fishing. The cheeses which have been available for this use have been those which are normally sold for human consumption. Such cheeses have physical properties which are unsuitable for a fish bait. They are either too stiff and crumbly to be impaled on a fishhook, or they are too soft and greasy for suitable use. Generally available cheese products lack sufficient adhesive strength for use under fishing conditions. It is difficult to mold them around a fish hook. They are readily washed from the hook by water after only a short period of use, and they are frequently dislodged from the hook when it is attempted to cast the bait.

Commercial fish baits which contain some cheese or cheese flavoring are available, but these baits are not considered by fishermen to be the equivalent of cheese as a bait. Thus, there is a need for a genuine cheese composition suitable for use as a fish bait.

SUMMARY OF THE INVENTION

The present invention provides a cheese composition formulated generally as a blended or processed cheese composition but modified by the inclusion of nonfat milk solids in place of a substantial portion of the cheese solids normally present in such spreads. The formulation is also modified by the addition of a suitable emulsifier and higher-than-ordinary quantities of hydrophyllic binding agents to maintain a high moisture content.

The fish bait of this invention is produced generally in the same fashion that processed and/or blended cheese spreads are produced. The procedures and compositions acceptable for the manufacture of processed and blended cheese spreads are codified in Title 21 of the United States Code of Federal Regulations under Chapter 1, Food and Drug Administration, beginning with Section 19.750. Any of the cheeses and other ingredients disclosed in the aforementioned Title 21 as suitable for use in cheese spreads may be included in the fish bait of this invention, although the proportions of the constituents in the claimed fish bait differ markedly from the proportions specified for use in cheese food generally.

Nonfat milk solids are present in the fish bait in amounts greatly exceeding the amounts employed in cheese food products generally. Sufficient nonfat milk solids should be present to impart a greaseless consistency to the composition. Typically, the maximum amount of milk solids that can be incorporated in the composition without forming crystals of milk sugars will be employed. Thus, a practical upper limit of the amount of mild solids which may be incorporated in the composition to obtain a desirable consistency is about 25 percent by weight, based on the total weight of the composition. Rarely will less than 15 percent by weight, on the aforestated basis, of nonfat milk solids be included. The percentage of cheese solids in the composition, while substantial, is thus considerably less than in corresponding cheese spread products.

The water content of the composition is desirably at least as high as is typical of cheese spreads. To bind the water in the composition, a quantity of natural gum or other hydrophyllic binder, such as sodium alginate, is desirably included in the composition. Normally, the binder will be present in the formulation in amounts between about 1.0 and about 2.5 percent by weight, considerably more than is allowable in cheese spreads. In any event, sufficient binder should be present to impart toughness to the composition, i.e., to insure that the composition is flexible with firm, internal adhesion. Stickiness is undesirable and is avoided by including adequate amounts of the binder.

Sufficient emulsifier is included to provide adequate firmness, i.e., solidity, to the composition. It has been found that many of the emulsifiers typically used in processed cheese spreads do not effectively solidify the cheese bait of this invention. For example, the ortho phosphates and the citrates, which are conventionally used in cheese spreads, are unsatisfactory for use in the claimed fish bait. Polyphosphate emulsifiers are generally effective and are thus preferred. The term "polyphosphate" is used herein and in the claims in its broadest sense to include salts which contain more than one phosphate group and includes both polysalts of orthophosphoric acids and salts of polyphosphoric acids. Particularly useful emulsifiers are tetrasodium pyrophosphate sodium tripolyphosphate; the sodium polymetaphosphates, e.g., sodium hexametaphosphate; and the corresponding potassium salts, e.g., the potassium polymetaphosphates. Other polyphosphate emulsifiers within contemplation include the alkali metal salts of the polyphosphates generally, particularly the pyrophosphates and including the condensed phosphonates, notably $N(CH_2PO_3H_2)_3$ and $N(CH_2PO_3Na_2)_3$. Although the precise chemical compositions and structures of many of the commercially available polyphosphates are not known, they are generally useful in the practice of this invention and with few exceptions produce excellent results.

The pH of the fish bait of this invention is a significant factor and is influenced by the pH of the emulsifier used. Although the preferred pH varies somewhat, depending upon the specific cheeses used, it should in nearly all cases be between about 5 and about 6.5. Ordinarily, compositions with pH below about 5.2 tend to crumble while those with pH above about 6.2 tend to be unduly sticky. The pH range of about 5.5 to about 5.9 is preferred with pH about 5.7 being considered optimum in most instances. When an emulsifier of low pH, such as sodium acid pyrophosphate is used, it should be mixed with sufficient phosphate of higher pH, e.g. tetrasodium pyrophosphate, or other basic material, e.g., alkali metal hydroxide notably sodium hydroxide, to avoid reducing the pH of the fish bait composition to the point that it becomes crumbly. Similarly, when a strongly basic enulsifier is used, its pH effect should be appropriately balanced, e.g., by adding phosphoric or other compatible acid to the composition to avoid undue stickiness.

The emulsifier is typically present in the composition in amounts ranging from about 1 to about 3 percent by weight, but in any event it is present in an amount effective to impart a firm consistency to the composition. Quantities of emulsifier in excess of 3 percent by weight, while tolerable, are of no significant benefit.

The proportions of cheese solids, nonfat milk solids, binder, emulsifier and water in the fish bait are adjusted to provide a greaseless, firm and tough consistency. Other constituents such as salt, preservatives, and coloring agents may be present in minor amounts. Desirably, the fish bait will contain less than about 10 percent by weight fat, about 8 to about 9 percent by weight fat being considered to be optimum. Rarely will the fish bait contain more than about 15 percent by weight fat or less than about 45 percent by weight water. Although the bait may contain as much as 60 percent by weight water, the composition tends to get sticky when much more than 55 percent by weight water is included. Compositions containing less than about 50 percent by weight water tend to be brittle.

The invention will be better understood by reference to the following specific examples.

Example I 1,512 pounds of cheddar bulk cheese; 1,188 pounds of monterey bulk cheese; and 432 pounds of swiss bulk cheeses are blended in conventional manner to produce a batch of 3,132 pounds of cheese stock typical of stocks used in production of processed cheese spreads. To about 150 pounds of this cheese stock are added 100 pounds nonfat, dry milk solids; 158 pounds water; 10 pounds tetrasodium pyrophosphate; 7½ pounds salt; 10 pounds natural vegetable gum; about 1 pound phosphoric acid; and about pound food coloring. The constituents are all thoroughly mixed in a steam injection cooker in the same fashion as processed cheese spreads are conventionally mixed. There results a composition with a pH of about 5.95 which contains about 55–0 percent by weight water and about 9.2 percent by weight fat. The composition has a cheese aroma and flavor but is markedly less greasy and considerably tougher and less fluid (i.e. firmer) than cheese spread food products.

ple III. Results are reported in the table. The compositions designated "good" would mold over a fishing hook without sticking to the fingers and would remain in place during prolonged periods of submersion in the water.

It should be understood that the fish bait of this invention may be produced from any of the various cheese combinations and mixtures which are suitable for use in processed or blended cheese spreads. Thus, the bait may be produced of

TABLE 1.—FISH BAITS INCORPORATING VARIOUS POLYPHOSPHATE EMULSIFIERS

|  | Emulsifier | Quantity | Final pH of bait | Physical properties of the bait |
|---|---|---|---|---|
| 1A | Sodium trimetaphosphate, (NaPO$_3$)$_3$ | 10 grams | 5.65 | Sticky. Insufficiently firm for use. |
| 1B | {Sodium trimetaphosphate / 20% NaOH solution} | {10 grams / 1 cc} | 5.83 | Firmer than 1A, but still too sticky. |
| 2A | Sodium acid pyrophosphate, Na$_2$H$_2$P$_2$O$_7$ | 10 grams | 5.1 | Too firm. Crumbly. |
| 2B | {Sodium acid pyrophosphate / Tetrasodium pyrophosphate, Na$_4$P$_2$O$_7$} | {2 grams / 8 grams} | 5.87 | Good consistency and adhesive strength. |
| 2C | {Sodium acid pyrophosphate / Tetrasodium pyrophosphate / Phosphoric acid} | {2 grams / 8 grams / 1 cc} | 5.5 | Not as good as 2B. Slightly crumbly. |
| 3A | Sodium tripolyphosphate, Na$_5$P$_3$O$_{10}$ | 10 grams | 5.95 | Good consistency and adhesive strength. |
| 3B | {Sodium tripolyphosphate / Phosphoric acid} | {10 grams / 1 cc} | 5.73 | Better than 3A. |
| 4A | {N(CH$_2$PO$_3$H$_2$)$_3$ / N(CH$_2$PO$_3$Na$_2$)$_3$} | {2 grams / 8 grams} | 5.6 | Good consistency and adhesive strength. |
| 4B | {N(CH$_2$PO$_3$H$_2$)$_3$ / N(CH$_2$PO$_3$Na$_2$)$_3$} | {3 grams / 8 grams} | 5.36 | Too crumbly for use. |

EXAMPLE II 85 pounds of cheddar cheese and 67 pounds of monterey cheese are blended in accordance with conventional processed cheese manufacturing techniques. To this cheese mixture is added 100 pounds nonfat dry milk; 158 pounds water; 10 pounds tetrasodium pyrophosphate; 6 pounds locust began gum; 4 pounds sodium alginate; 14 ounces sorbic acid; 15 ounces phosphoric acid; and 8 ounces food coloring agent. All of the constituents are thoroughly blended and mixed to produce an excellent fish bait composition. The composition has a pH of about 5.9 and contains, by weight, 56.1 percent water, 21 percent milk solids and 9.6 percent fat.

EXAMPLE III

About 44.5 pounds of water is heated to about 150° F. in an externally heated cooker. About 0.75 pound of sodium alginate is dissolved in the water. After which 30 pounds of cheddar cheese is added to the cooker, followed by the addition of 20 pounds nonfat dry milk solids in which is mixed about 1.12 pounds of Locust Bean Gum; 2 pounds tetrasodium pyrophosphate; 0.17 pounds sorbic acid; 1.5 pounds salt; 85 cc.–85 percent phosphoric acid; and 37.5 cc. food coloring. The mixture is thoroughly blended at 180° F. to produce an excellent fish bait with pH about 5.9.

EXAMPLE IV

A basic stock of fish bait is prepared with the following approximate composition:

| Component | Percent by Weight |
|---|---|
| Cheddar cheese | 30.0 |
| Nonfat milk solids | 20.0 |
| Locust Bean Gum | 1.1 |
| Water | 44.4 |
| Sodium alginate | 0.75 |
| Salt | 1.5 |
| Emulsifier | remainder |

Portions of this basic mix containing 150 grams of cheese are then blended with various emulsifiers as reported in table 1 following the procedure described in connection with example II. Results are reported in the table. The compositions designated "good" would mold over a fishing hook without sticking to the fingers and would remain in place during prolonged periods of submersion in the water.

any cheese at hand or in surplus. Other fish-attracting constituents may be incorporated in the fish bait if desired.

Reference herein to specific details of certain preferred embodiments is not intended to limit the scope of the invention except insofar as said details are recited in the appended claims. Many modifications within the scope of this invention will be suggested to those skilled in the art by the present disclosure.

I claim:
1. A cheese composition for use as a fish bait which comprises cheese and containing fat, blended as in processed cheese; nonfat milk solids, to impart a greaseless consistency to the composition and, in an amount above about 15 percent by weight and below the concentration which results in the formation of crystals of milk sugars in said composition; water; an effective amount of a hydrophyllic binder to bind the water and impart toughness to the composition; and an effective amount of a water soluble polyphosphate emulsifier to impart firmness to the composition; the quantities and proportions of cheese, nonfat milk solids, and water in said composition being adjusted to result in a total fat content of about 8 to about 15 percent and a total water content of about 45 to about 60 percent by weight, respectively, based on the total weight of the composition.

2. The cheese composition of claim 1, wherein the polyphosphate emulsifier is selected from the group consisting of sodium acid pyrophosphate, tetrasodium pyrophosphate, sodium tripolyphosphate, and mixtures thereof; and the condensed phosphonates, N(CH$_2$PO$_3$H$_2$)$_3$ and N(CH$_2$PO$_3$Na$_2$)$_3$, and mixtures thereof, the pH of said composition being adjusted to a value between about 5.5 and about 5.9.

3. The cheese composition of claim 1, wherein the polyphosphate emulsifier comprises tetrasodium pyrophosphate and sufficient phosphoric acid is included in the composition to adjust the pH of the composition to a value between about 5.2 and about 6.2.

4. The cheese composition of claim 1 wherein the pH is adjusted to a value above that at which the composition is sticky and below that at which the composition is crumbly.

5. The cheese composition of claim 4, wherein the pH is adjusted to between about 5.2 and about 6.2.

6. The cheese composition of claim 5 wherein the pH is adjusted to between about 5.5 and about 5.9.